Aug. 16, 1938.  M. A. E. LEVY ET AL  2,127,063
WEIGHING APPARATUS
Filed Aug. 8, 1935   2 Sheets-Sheet 1

Inventors
Marcel A. E. Levy and
William A. Loth

By: Glascock Downing Seebold
Attys.

Aug. 16, 1938.  M. A. E. LEVY ET AL  2,127,063
WEIGHING APPARATUS
Filed Aug. 8, 1935  2 Sheets-Sheet 2
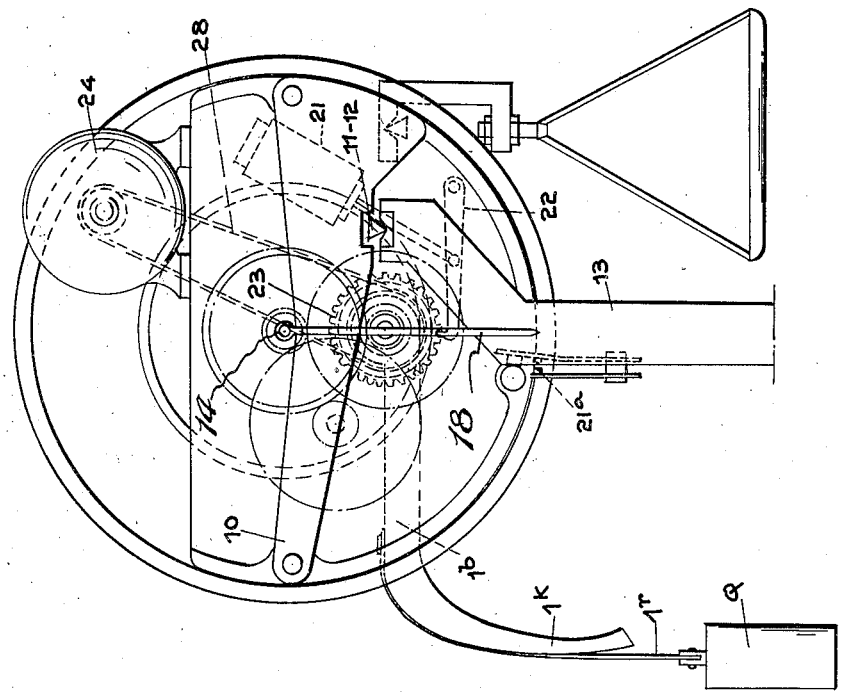
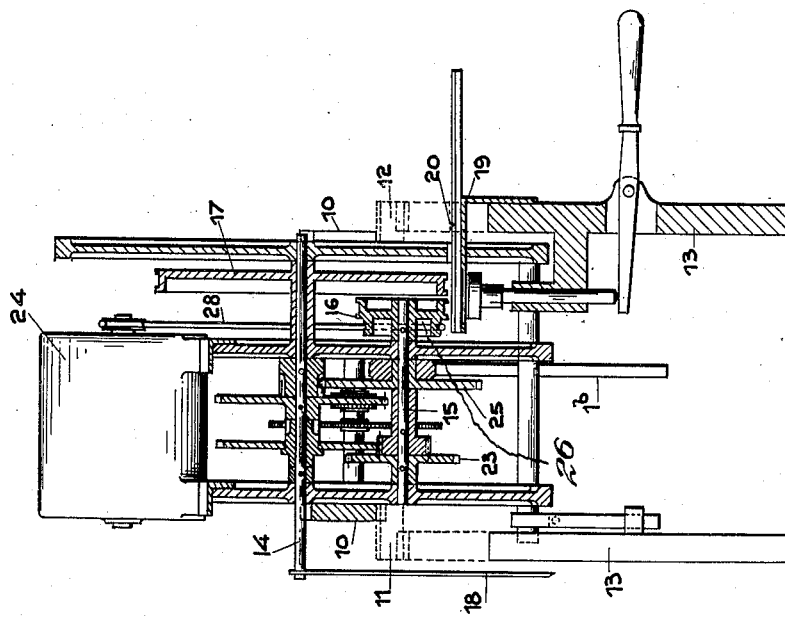
Inventors,
Marcel A. E. Levy and
William A. Loth
By: Glascock Downing & Seebold
Attys.

Patented Aug. 16, 1938

2,127,063

UNITED STATES PATENT OFFICE 2,127,063

WEIGHING APPARATUS

Marcel Adrien Elie Levy and William Arthur Loth, Paris, France, assignors to Société Anonyme: Société Francaise de Métrographie, Paris, France Application August 8, 1935, Serial No. 35,385
In France August 13, 1934

10 Claims. (Cl. 265—27)

The present invention relates to weighing apparatus and comprising a beam having a single position of equilibrium, which supports an angularly movable arm. The mass to be weighed and a balancing counter-weight being respectively carried by the beam and movable arm, or vice versa.

The invention is characterized by the fact that the angular movement of the arm is automatic, this movement being stopped by an interlocking device which holds the arm stationary relatively to the beam when the latter arrives at its position of equilibrium.

The invention therefore is characterized by a movable arm on the beam and the angle through which it moves, up to equilibrium or from equilibrium to a definite position of the beam, is the measure of the weight on the beam.

The driving energy for rotating the movable arm may be supplied by a motor or by the load to be weighed or by the counter-weight. Automatic apparatus is then provided which is of a new type both in its arrangement and in the results obtained therefrom. Although the load or the counter-weight affects work, this work which is borrowed from the internal energy of the system is not prejudicious to the accuracy of the weighing operation. Thus the apparatus can directly drive a recording or printing device without the accuracy of the weighing apparatus being affected thereby.

The various objects and features of the invention will be more apparent upon a consideration of the following description and the accompanying drawings, wherein various forms of the invention are illustrated by way of example.

In the drawings:

Figure 2 is a view in elevation of the balancing apparatus according to the invention.

Figure 3 is a sectional view of the apparatus shown in Figure 2.

Figure 1:
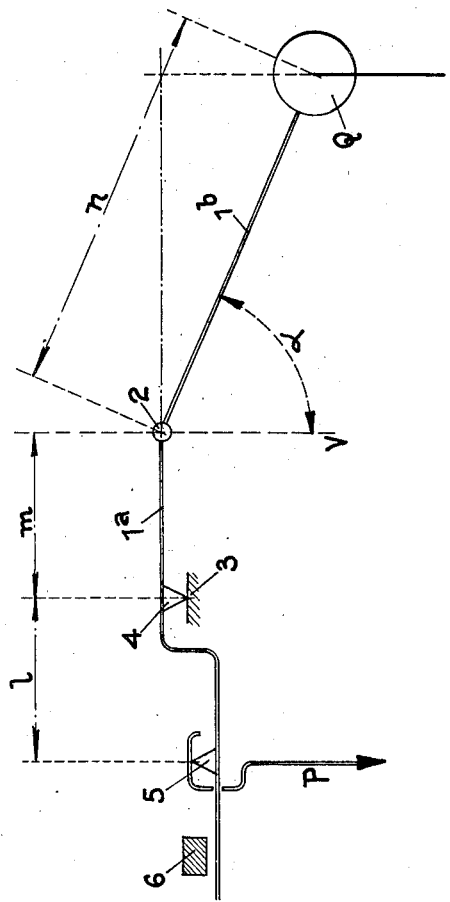
Figure 1 is an explanatory diagram of an embodiment of the invention.

In Figure 1, the weighing apparatus comprises a beam $1a$ having a single position of equilibrium and an angularly movable arm $1b$. The parts $1a$ and $1b$ are pivotally mounted as indicated at 2. These parts are therefore capable of forming together a variable angle and it is to be noted that the variation of this angle is capable of being controlled by the operator as in known apparatus of this type.

The beam $1a$ rests on a fixed support 3 by means of a knife edge 4. Another knife edge 5 is provided on the beam $1a$ for receiving the load P to be measured. The arm $1b$ is provided with a counter-weight Q.

If V is a vertical line passing through the pivot 2; $l$ the horizontal distance between the apices of the knife edges 4 and 5; $m$ the horizontal distance between the apex of the knife edge 4 and the pivot pin 2; $n$ the distance between the pivot pin 2 and the center of gravity of the arm $1b$ with its counter-weight Q; and finally $\alpha$ the angle formed with the vertical line V by the arm $1b$ at any moment.

The equation of equilibrium, the line 5—4 being assumed to be horizontal and the pivot pin being rigid by any means, is:

$$Pl = Qm + Qn \text{ sine } \alpha$$

In the embodiment of the invention shown in Fig. 1, use is made for automatically operating the balance of the potential energy either by the load to be weighed or by the counter-weight without however, the work executed by the load of the counter-weight being prejudicious to the accuracy of the position of equilibrium.

At the beginning of the weighing operation, the arm $1b$ is horizontal and the torque exerted by the counter-weight Q is greater than that of the load P. Assuming the parts $1a$ and $1b$ being rigid the unit $1a$—$1b$ has a tendency to rotate in a clockwise direction and the beam $1a$ abuts against the fixed member 6. If at this moment the arm $1b$ is released it begins to drop by rotating about the pivot pin 2.

The arm $1b$ is connected to the beam $1a$ not only by the pivot pin 2 but also by a device suitable for slowing down the speed with which the counter-weight drops for instance, for rendering this speed practically uniform.

This condition of permitting the counter-weight to drop at a uniform speed is not necessary as will be hereinafter described, but it is convenient for the first explanation to assume that such movement of the counter-weight is insured. On the other hand, means is provided to render the beam $1a$ and the arm $1b$ rigid together as soon as equilibrium is obtained.

The dropping movement of the counter-weight Q being assumed uniform there is no need to take into consideration any force of inertia in the equation of equilibrium, which is:

$$Pl - Qm - Qn \text{ sine } \alpha = 0 \qquad (1)$$

When the sine $\alpha$ will have reached the value resulting from this equation:

$$\text{sine } \alpha = \frac{Pl - Qm}{Qn} \qquad (2)$$

the static equilibrium relatively to the pivot point 4 will be obtained at this moment, the beam $1a$ moves away from the fixed abutment 6 and by any means such as for example, a pawl 8 actuated by a pendulum 34 as hereinafter explained may be employed to connect the parts $1a$ and $1b$ rigidly together. The equilibrium obtained is therefore maintained and the angle α measures the value of the load P.

If the dropping movement of the counter-weight Q is not uniform a force of inertia is applied in a direction reverse to the counter-weight Q; everything therefore takes place as if the mass of the counter-weight Q was reduced. Therefore the apparent equilibrium will take place for an angle α' greater than the angle α corresponding to the true equilibrium. Both parts 1a and 1b will be rendered rigid together which will stop the fall of the counter-weight Q; the force of inertia disappearing, the unit will rock about the knife edge 4 for moving the beam 1a against the fixed abutment 6. The lever 1b will be released and will begin its movement over again for thus gradually obtaining the position of exact static equilibrium in which it will definitely stop.

Figure 4:
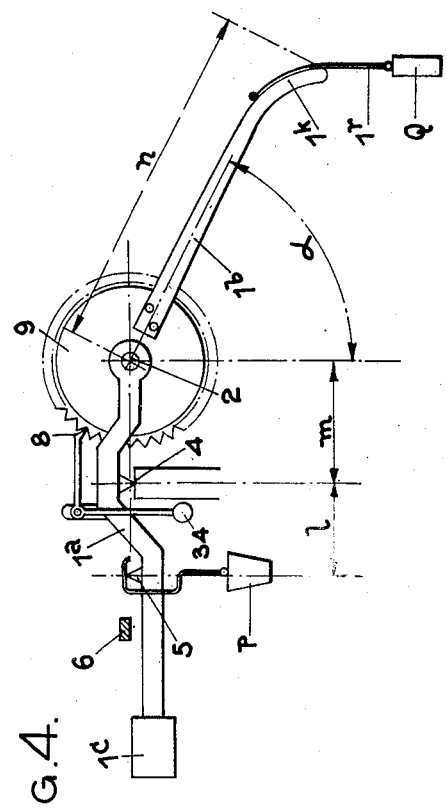
Figure 4 is a view of another embodiment of the invention.

In the foregoing it is the sign of the sine of the angle α which is proportional to the load P to be measured; but provisions can readily be made in order that the angle α itself should be proportional to the load P by utilizing any of the well known means for rectifying the sine. For example, the arm 1b may terminate in a cam 1k of involute shape on which is arranged a flexible cable 1r retaining the counter-weight Q as shown in Fig. 4.

The cam 1k of involute shape is of special importance since the center of gravity of the beam does not move in the vertical direction. The same result might however, be obtained by moving the arm 1b in the horizontal plane. However, in this case the load of the counter-weight could not act as a driving element.

The drop of the counter-weight Q produces a reduction of the internal energy of the system which reduction does not interfere in any way with the exactness of the position of static equilibrium. It will then be understood that it is possible without inconvenience to use this consumption of energy for the actuation of indicating, recording, or printing devices.

In the preceding Equation (1) $Qm$ can be eliminated by means of a counter-weight 1c (Fig. 4) or a retarding element arranged on the beam 1a. If, on the other hand, use is also made of known means for rectifying the sine, as for instance, a cam in the shape of an involute curve terminating the arm 1b as just described, one will have:

$$\alpha = \frac{Pl}{Qn} \quad (3)$$

In Fig. 4, as already explained, the pawl 8 is actuated by the pendulum 34. When the counter-weight Q is raised for being placed in a horizontal position before measurement, the beam 1a rocks in a clockwise direction about point 4. The pendulum 34 rotates in reverse direction relative to the movement of the beam 1a and releases the pawl 8. When equilibrium is obtained under the action of the downward movement of counter-weight Q, the beam 1a rocks in a reverse direction and the pawl 8 engages with the teeth of the wheel 9, preventing any further rotation of the latter.

Figs. 2 and 3 illustrate a practical form of construction. The apparatus shown in these figures comprises a frame 10, which is the equivalent of the beam 1a of the diagrammatic example. The frame 10 rests by means of knife edges 11 and 12 on a support 13. Within the frame 10 are mounted rotatable shafts 14 and 15. On the shaft 15 is loosely mounted a gear wheel 25, on the hub of which is secured the arm 1b carrying the counter-weight Q attached to the flexible band 1r. The wheel 25 drives through a train of gears so as to provide suitable speed reduction of the shafts 14 and 15. A printing wheel 16 is rigidly secured to the shaft 15 and another wheel 17 is mounted on the shaft 14. The wheel 17 prints the higher units and the wheel 16, the lower units. The speed reducing train of gears therefore fulfills a double function, namely, that of reducing the speed or fall of the counter-weight Q and that of causing the wheels 16 and 17 to rotate in a suitable speed ratio.

The shaft 14 carries an index 18 while the dial is preferably mounted on the frame 10. The chute 19 through which the tickets are inserted for printing, is preferably mounted on the fixed support 13 and passes through the frame 10 which rocks slightly through an aperture 20.

The frame 10 moves upon equilibrium from its normal position, and a contact 21a closes which may be used for closing a circuit to an electromagnet 21. An electromagnet 21 which by the attraction of its armature causes a pawl 22 to engage with the teeth of the wheel 23 fixed on the shaft 15. This pawl fulfills a double function, as it renders the frame 10 rigid with the arm 1b (the shaft 15 and the shaft 14 consequently can no longer rotate) and it holds the wheel 16 stationary in a proper printing position.

For raising the counter-weight use may be made of a motor 24 mounted on the frame 10 adapted to drive the shaft 15 through a belt 28 and a pulley 26. The counter-weight might also be normally placed in a lowered position and it may be lifted by the motor for effecting the weighing operation. In the second case the energization of an electromagnet 21 may then advantageously open the motor circuit. However, if this circuit is not open the belt 28 would slide on pulley 26 without serious inconvenience.

What we claim as our invention and desire to secure by Letters Patent is:

1. A weighing apparatus comprising: a beam having a single position of equilibrium,—an angularly movable arm, carried by said beam,—a counterweight and means for supporting the load to be weighed, respectively carried by the movable arm and by the beam,—means controlled by the position of the beam for holding the movable arm stationary relatively to the beam, when the latter is in its position of equilibrium.

2. A weighing apparatus comprising: a beam having a single position of equilibrium,—a movable arm,—means for connecting the movable arm to the beam, in order to impart to said arm, relatively to said beam, an angular movement in a vertical plane,—a counterweight and means for supporting the load to be weighed, respectively carried by the movable arm and by the beam,—automatic means for holding the movable arm staitonary, relatively to the beam, when the latter is in its position of equilibrium.

3. A weighing apparatus comprsing: a beam having a single position of equilibrium,—a movable arm,—means for connecting the movable arm to the beam, in order to impart to said arm, relatively to said beam, an angular movement in a vertical plane,—means carried by the beam for supporting the load to be weighed,—a counterweight carried by the movable arm,—automatic means for holding the movable arm stationary, relatively to the beam, when the latter is in its position of equilibrium.

4. A weighing apparatus comprising: a beam having a single position of equilibrium,—a movable arm terminated by a cam in the shape of an involute,—means for connecting the movable arm to the beam, in order to impart to said arm, relatively to said beam, an angular movement in a vertical plane,—means carried by the beam for supporting the load to be weighed,—a counterweight,—a flexible cable secured to the movable arm and bearing on the cam in the shape of an involute for retaining the counterweight, automatic means for holding the movable arm stationary, relatively to the beam, when the latter is in its position of equilibrum.

5. A weighing apparatus comprising: a beam having a single position of equilibrium,—an angularly movable arm carried by said beam,—a counterweight and means for supporting the load to be weighed, respectively carried by the movable arm and by the beam,—a motor for producing the angular displacement of the movable arm relatively to the beam,—automatic means for holding the movable arm stationary, relatively to the beam, when the latter is in its position of equilibrium.

6. A weighing apparatus comprising; a beam having a single position of equlibrium,—a movable arm,—means for connecting the movable arm to the beam, in order to impart to said arm, relatively to said beam, an angular movement in a vertical plane, a motor carried by the beam for producing the angular displacement of the movable arm relatively to the beam,—automatic means for holding the movable arm stationary relatively to the beam, when the latter is in its position of equilibrium.

7. A weighing apparatus comprising: a beam having a single position of equilibrium,—an angularly movable arm carried by said beam,—a counterweight and means for supporting the load to be weighed, respectively carried by the movable arm and by the beam,—a toothed wheel rigid with the movable arm,—a pawl cooperating with the toothed wheel,—means for causing the pawl to engage with the teeth of the toothed wheel when the beam is in its position of equilibrium.

8. A weighing apparatus comprising: a beam having a single position of equilibrium,—a movable arm,—means for connecting the movable arm to the beam, in order to impart to said arm, relatively to said beam, an angular movement in a vertical plane,—a counterweight and means for supporting the load to be weighed, respectively carried by the movable arm and by the beam,—a toothed wheel rigid with the movable arm,—a pawl cooperating with the toothed wheel,—a counterweight mounted on the pawl,—a pivot pin mounted on the beam for supporting said pawl.

9. A weighing apparatus comprising: a beam having a single position of equilibrium,—a movable arm,—means for connecting the movable arm to the beam, in order to impart to said arm, relatively to said beam, an angular movement in a vertical plane,—means carried by the beam for supporting the load to be weighed,—a counterweight carried by the movable arm,—a toothed wheel rigid with the movable arm,—a pawl cooperating with the toother wheel, an electromagnet so arranged as to cause the pawl to engage with the toothed wheel, when it is energized,—means carried by the beam for energizing said electromagnet when the beam is in its position of equilibrum.

10. A weighing apparatus comprising: a beam having a single position of equilibrium,—an angularly movable arm carried by the said beam,—a counterweight and means for supporting the load to be weighed, respectively carried by the movable arm and by the beam, automatic means for holding the movable arm stationary, relatively to the beam, when the latter is in its position of equilibrium,—indicating wheels carried by the beam,—gears for transmitting to said wheels the movement of the movable arm relatvely to the beam.

MARCEL ADRIEN ELIE LEVY.
WILLIAM ARTHUR LOTH.